US010087052B2

(12) United States Patent
Koch

(10) Patent No.: US 10,087,052 B2
(45) Date of Patent: Oct. 2, 2018

(54) OVERHEAD CRANE AND ASSEMBLY OF AT LEAST TWO OVERHEAD CRANES

(71) Applicant: RAADGEVEND INGENIEURSBURO F. KOCH B.V., Goes (NL)

(72) Inventor: Franciscus Koch, Lewedorp (NL)

(73) Assignee: RAADGEVEND INGENIEURSBURO F. KOCH B.V., Goes (NL)

( * ) Notice: Subject to any disclaimer, the term of this patent is extended or adjusted under 35 U.S.C. 154(b) by 750 days.

(21) Appl. No.: 14/415,970

(22) PCT Filed: Jul. 5, 2013

(86) PCT No.: PCT/NL2013/050502
§ 371 (c)(1),
(2) Date: Jan. 20, 2015

(87) PCT Pub. No.: WO2014/014342
PCT Pub. Date: Jan. 23, 2014

(65) Prior Publication Data
US 2015/0183621 A1    Jul. 2, 2015

(30) Foreign Application Priority Data

Jul. 18, 2012 (NL) ..................................... 2009203
Sep. 21, 2012 (NL) ..................................... 2009502

(51) Int. Cl.
*B66C 17/20* (2006.01)
*B66C 19/00* (2006.01)
*B65G 63/00* (2006.01)

(52) U.S. Cl.
CPC ............ *B66C 17/20* (2013.01); *B65G 63/004* (2013.01); *B66C 19/002* (2013.01); *B66C 19/007* (2013.01)

(58) Field of Classification Search
CPC .......... B66C 11/00–11/14; B66C 17/00; B66C 17/20; B66C 19/00; B66C 19/002; B66C 19/007
See application file for complete search history.

(56) References Cited

U.S. PATENT DOCUMENTS 3,881,608 A * 5/1975 Hupkes ................... B66C 13/30
                                                            212/276
5,857,821 A   1/1999 Wiedeck
(Continued)

FOREIGN PATENT DOCUMENTS

| GB | 1 214 618 A | 12/1970 |
|---|---|---|
| JP | 2008174374 A | 7/2008 |
| WO | 01/62656 A2 | 8/2001 |

OTHER PUBLICATIONS

International Search Report, dated Oct. 18, 2013, from corresponding PCT application.

*Primary Examiner* — Sang K Kim
*Assistant Examiner* — Nathaniel L Adams
(74) *Attorney, Agent, or Firm* — Young & Thompson

(57) ABSTRACT

An overhead crane (21, 22) for hoisting and moving containers (2) includes a rail track (23, 24) which rests on the ground via columns (25), and a frame (31, 32) which is displaceable along the rail track (23, 24) and is provided with elements for picking up and hoisting containers (2). In particular, the frame (31, 32) is suitable to accommodate at least one container (2) completely. In an assembly (20) of at least two overhead cranes (21, 22), the rail tracks (23, 24) of the overhead cranes (21, 22) extend at different levels with respect to the ground, substantially parallel with respect to each other, and rest on the ground via common columns (25). One of the advantages of this arrangement is the fact that the overhead cranes (21, 22) can pass each other.

17 Claims, 15 Drawing Sheets

(56) References Cited

U.S. PATENT DOCUMENTS

| | | | | |
|---|---|---|---|---|
| 5,951,226 | A * | 9/1999 | Fantuzzi | B66C 19/002 |
| | | | | 212/316 |
| 6,530,492 | B2 * | 3/2003 | Weis | B66C 19/002 |
| | | | | 212/316 |
| 2003/0077154 | A1 | 4/2003 | Franzen et al. | |
| 2010/0239402 | A1 * | 9/2010 | Holmedal | B65G 63/045 |
| | | | | 414/573 |

* cited by examiner

OVERHEAD CRANE AND ASSEMBLY OF AT LEAST TWO OVERHEAD CRANES

FIELD OF THE INVENTION

The invention relates to an overhead crane for hoisting and moving containers, comprising a rail track which rests on the ground by means of columns, and a frame which is displaceable along the rail track and is provided with means for picking up and hoisting containers. The invention also relates to an assembly of at least two overhead cranes.

BACKGROUND OF THE INVENTION

An overhead crane for hoisting and moving containers can be used in both sea port container terminals and inland port terminals. A sea port container terminal usually comprises three areas. A strip, which is situated directly on the water and has a width of approximately 50 meters, is also referred to as the ship to shore (STS) area. This is the area in which the containers are transferred from the ocean-going vessels which have entered the harbour onto land using the large cranes on board, also referred to as STS cranes.

Directly behind the STS area, on the landward side of the STS area, there is a transfer zone where the containers are taken to a storage yard by means of so-called straddle carriers or automated guided vehicles (AGV's). This area is approximately 100 to 120 meters wide. The storage yard is also referred to as the stack area.

Depending on the size of the terminal and the transportation means, the width of the stack area varies between 300 and 700 meters. The length of the stack area is usually equal to the length of the quayside.

Over the course of the last 20 years, the loading and unloading speed of the STS cranes has steadily increased in order to ensure that the vessels are moored on the quayside for as short a time as possible. This has resulted in congestion in or just in front of the stack area, requiring the creation of intermediate buffers.

It is an object of the invention to increase the processing speed in the stack area compared to the current situation. It is another object of the invention to increase the stacking capacity while not increasing the surface area. A greater stack density saves valuable space. Stacking the containers higher does increase the stack density, but, with the crane systems which are currently being used in the stack area, the so-called stack crane systems, it is disadvantageous in terms of the time ("digging time") which is spent when containers from the bottom layers have to be transported first.

The stacking height of stacks of containers which are transported across the terminal using straddle carriers is usually 1 over 3. This means that the stack comprises three layers and that there is one layer which is reserved for transport movements above these.

With cranes which are known as rail-mounted gantry cranes (RMGs), i.e. cranes which may be defined as gantry cranes travelling on rails which have been laid at ground level, the stacking height is already 1 over 4 or even 1 over 6, despite the abovementioned drawback of the increasing "digging time".

For the sake of completeness, it should be noted that the effective processing speed in a stack is determined to a significant degree by the number of cranes, the speed of the cranes, both when travelling and when hoisting, the stack density, the degree of automation, the susceptibility to failure, the redundancy and the length-to-width-ratio of the stack lanes.

As has been indicated above, the cranes in the stack areas of container terminals are often configured as RMGs which travel on rail systems which have been installed at ground level. These RMGs have the drawback that they cannot pass each other, so that the working area of an RMG is linked to the seaward side or the landward side of a terminal. Another drawback is the fact that the gantry structure has a considerable dead load and therefore it requires a large amount of power to drive the crane. It is quite common to use a dead weight of 150 tonnes to transport a container weighing 30 tonnes. Furthermore, the travelling speed is limited, as the centre of gravity is situated high above the wheels, which is disadvantageous for both the longitudinal stability and the transverse stability and the swinging of the load during transportation.

In order to enable RMGs to pass each other in one lane (also referred to as a track) of the stack area, according to the prior art, an oversized RMG is added which also serves as a replacement in case one of the other RMGs fails. The drawback of this solution is that the additional rail system to accommodate the oversized RMG takes up a great deal of space along the entire length of the lane. Another drawback is the fact that the workload during normal operation is lower for each RMG than is the case with two RMGs in one lane. In lanes with two RMGs, a problem again arises when one of the two RMGs fails, since the RMGs cannot pass each other. In order to solve this problem, a so-called rescue crane has been developed for the current situation, which can be used to pick up a broken-down RMG and move it.

JP 2008/174 374 A discloses a multistory warehouse comprising a container housing zone in each floor, an overhead crane in each floor moving along the container line of the container housing zone, a container delivering zone provided in an end of the container housing zone of the first floor wherein container carry-in/out trucks move, and a spreader elevating zone formed over the container carry-in/out zone so as to vertically move a spreader of the overhead crane of each floor to the container carry-in/out zone.

WO 01/62 656 A2 discloses an empty container storage for the intermediate storage of empty containers, especially in fully automatic container terminals of seaports or river ports, characterised by a full gantry bridge crane that can be automated, traverses the empty container storage, can be moved on an elevated craneway and has a travelling crab that can be moved thereon in the longitudinal direction thereof.

SUMMARY OF THE INVENTION

The invention is aimed at increasing the processing speed in the stack area using overhead cranes, which can generally achieve much greater speeds of travel than RMGs. In particular, the invention provides an overhead crane whose frame, such as a truss frame, can accommodate at least one container completely. To accommodate completely means that the container's lower edge is above the lowest edge of the frame. In other words, the container is surrounded by the (truss) frame. The truss frame provides a (three dimensional) structure which is open from the underside so that a container can be moved into the space enclosed by the frame. In other words, a container can be held inside the frame, so that no part of the container extends beyond the boundaries of the frame. This advantageously allows the construction of compact overhead cranes that can be used in assemblies of multiple such cranes, where one crane (at least the moveable part thereof) can pass another crane. Various embodiments of such assemblies are described in this application and in the attached claims.

In known assemblies of overhead cranes, the container is always located substantially below the frame of the overhead crane carrying it. In conventional "multi-story" arrangements, where cranes can pass below or over each other, the distance between the cranes must be substantial since also the carried containers must be able to pass the other cranes without collision. This has the drawback that the required height of the assembly is greatly increased.

Therefore, the invention also provides an assembly of at least two overhead cranes with a truss frame, in which the rail tracks of the overhead cranes extend substantially parallel to each other at different levels with respect to the ground, and rest on the ground by means of common columns. In an advantageous embodiment, the parallel rail tracks are placed at such a distance to each other so that two overhead cranes, being movable along the respective rails, can just pass each other. Because the overhead cranes have a frame that can completely accommodate a container, it is also possible for overhead cranes carrying a container to pass each other. This advantageously makes it possible to use more overhead cranes in a single "lane" than with assemblies of conventional overhead cranes. In other words, due to the fact that with the overhead crane according to the invention, the containers can be hoisted completely inside the frame, to which end the frame is open on the underside, it is possible to transport the containers over one another at a very short distance apart in the horizontal plane in the assembly of overhead cranes. In this case, it is also possible for the overhead cranes to pass each other in one and the same lane in the same or opposite direction of travel.

The columns on which the rails of each overhead cranes are supported, can be shared between the overhead cranes. For a single lane which may have multiple overhead cranes, a single set of columns can be sufficient. It is possible to provide one set of rails for each overhead crane (at different heights to allow more than one overhead crane to work over the full range of the lane). It is also possible to have two or more overhead cranes share a rail.

The overhead crane according to the invention can be configured in at least two main configurations, namely with a truss frame which has upper truss girders, above the level of the rail track, and with a truss frame which has lower truss girders, below the level of the rail track. The truss frame with upper truss girders can be configured to have an overhang on one or two sides. The overhang advantageously allows an overhead container to carry a load (inside the frame) in a transverse direction over the rail to another lane. This is yet a further example of an advantage made possible by a frame that can completely accommodate a container. Irrespective of the configuration of the overhead crane which is selected, the truss frames are preferably configured in such a manner that, in case of failure, one crane can pick up the frame of the other crane and move it outside the work area.

In summary, the following advantages and further aspects of the invention can be mentioned.

The overhead cranes can pass each other in the same lane, both in the empty and in the loaded state.

The containers can be hoisted until they are completely within the frame of the overhead crane. As a result thereof, it is possible to transport containers over one another at a very short distance apart in the horizontal plane.

Each overhead crane can pick up the frame of another crane and take it to another location.

If an overhead crane with a frame of upper truss girders is used as the highest crane, containers can be stacked to virtually the same height as the height of the upper crane track beams which define the rail track for said crane. The columns can thus be made lower than is the case with a conventional overhead crane. Due to the fact that the overhead crane with upper truss girders can transport a container above the upper layer of the stack, a spare half-layer is also created, which is very important in order to be able to make optimum use of the stack area.

By constructing the frames of the overhead cranes from two truss girders having a height which is slightly greater than the height of a container, it is possible to produce a light-weight structure, which still has a greater strength and rigidity than traditional overhead cranes. The dead weight of the overhead cranes is thus much lower than that of the current overhead cranes, and significantly lower than the dead weight of the RMGs.

Each overhead crane comprises means for picking up and hoisting the containers. This may be a spreader which is known per se. Even if the crane only comprises one spreader, the crane can still lift two containers simultaneously. This is achieved by the fact that the frame is provided with a number of rotatable or tiltable supports near the underside of a floor part which is displaceable in the longitudinal direction. A first container can be held in the frame by means of such supports, while the spreader can move to an adjacent position in order to pick up a second container. In this example, it would thus be possible to transport four 40-foot or eight 20-foot containers simultaneously in the longitudinal direction of the stack area, as a result of which the problem of congestion is effectively solved.

At a location in the stack area which is to be freely determined, a higher crane track may be fitted transversely across the lanes of the assembly of the overhead cranes, thus making it possible to move the overhead cranes from one lane to another lane in a simple manner. This may be useful in case of defects and breakdowns, but also, for example, if additional capacity is required in a certain area of the stack.

In contrast with conventional RMGs, this system makes it possible to move the containers in a direction parallel to the quayside instead of in a direction at right angles to the quayside.

It will be clear that the current RMGs could also be fitted with a truss frame according to the invention (see FIGS. 12 and 13), so that they can transport more than one container at the same time. Although this would increase the operating speed, it would not eliminate the abovementioned drawbacks of greater dead weight, inability to pass each other and the high centre of gravity.

Moreover, the current RMGs are virtually always used in stack lanes in which the longitudinal axis of the containers is situated at right angles to the quayside.

BRIEF DESCRIPTION OF THE FIGURES

The abovementioned aspects, features and advantages of the invention are explained in more detail on the basis of the figures, in which identical or similar parts are denoted by the same reference numerals. On the attached drawing sheets.

DETAILED DESCRIPTION

Figure 1A:
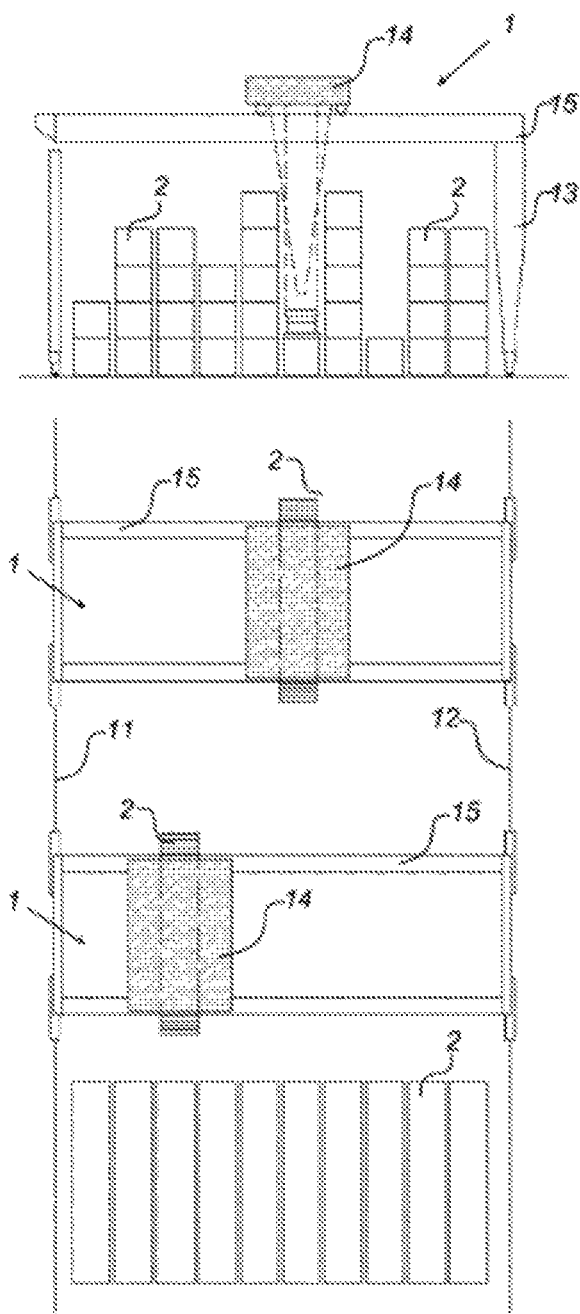
FIGS. 1 and 2 show the use of conventional RMGs.
Figure 1B:
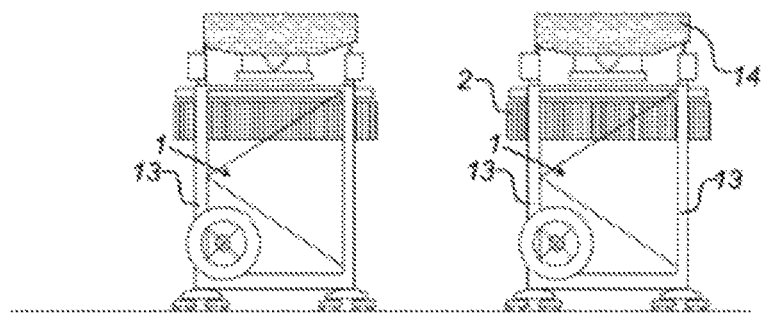

FIG. 1a and FIG. 1b show the use of two conventional RMGs 1 for hoisting and moving containers 2, which run on rail tracks 11, 12, one behind the other. The RMGs comprise a gantry structure 13 and a mechanism 14 for picking up and hoisting the containers 2, which is situated on an upper beam 15 of the gantry structure 13 and is displaceable with respect to said upper beam 15.

Figure 2A:
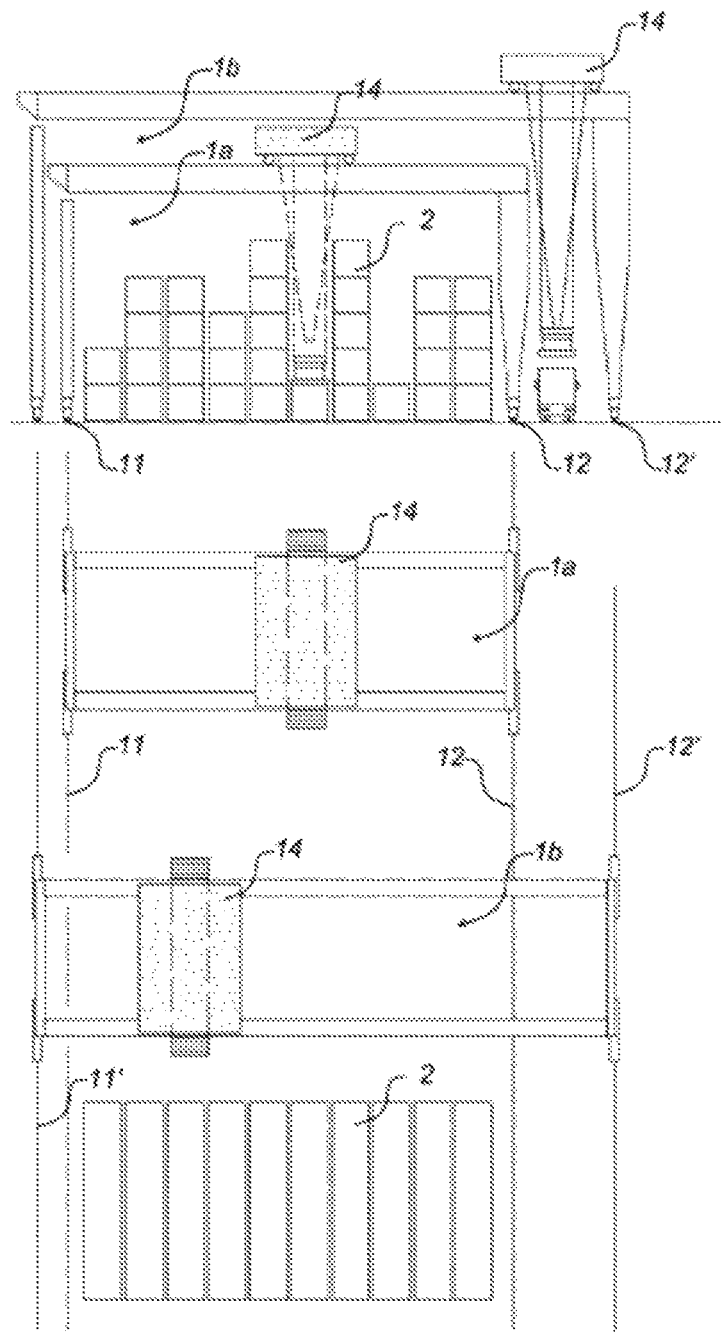
Figure 2B:
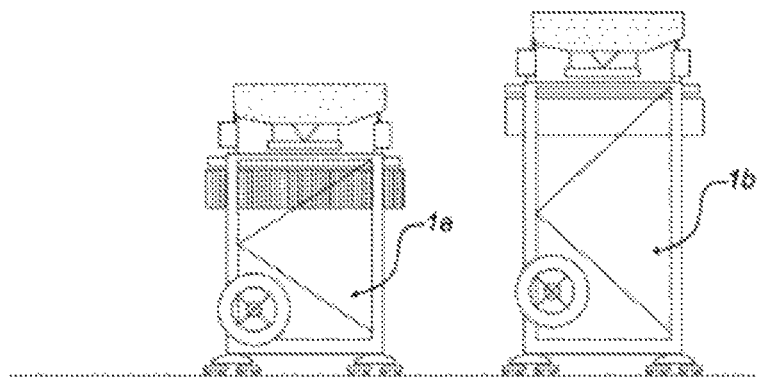

FIG. 2a and FIG. 2b show the use of two conventional RMGs 1a, 1b for hoisting and moving containers 2, in which one of the RMGs is an oversized RMG 1b which runs on a separate, extra wide rail track 12'.

Figure 3:
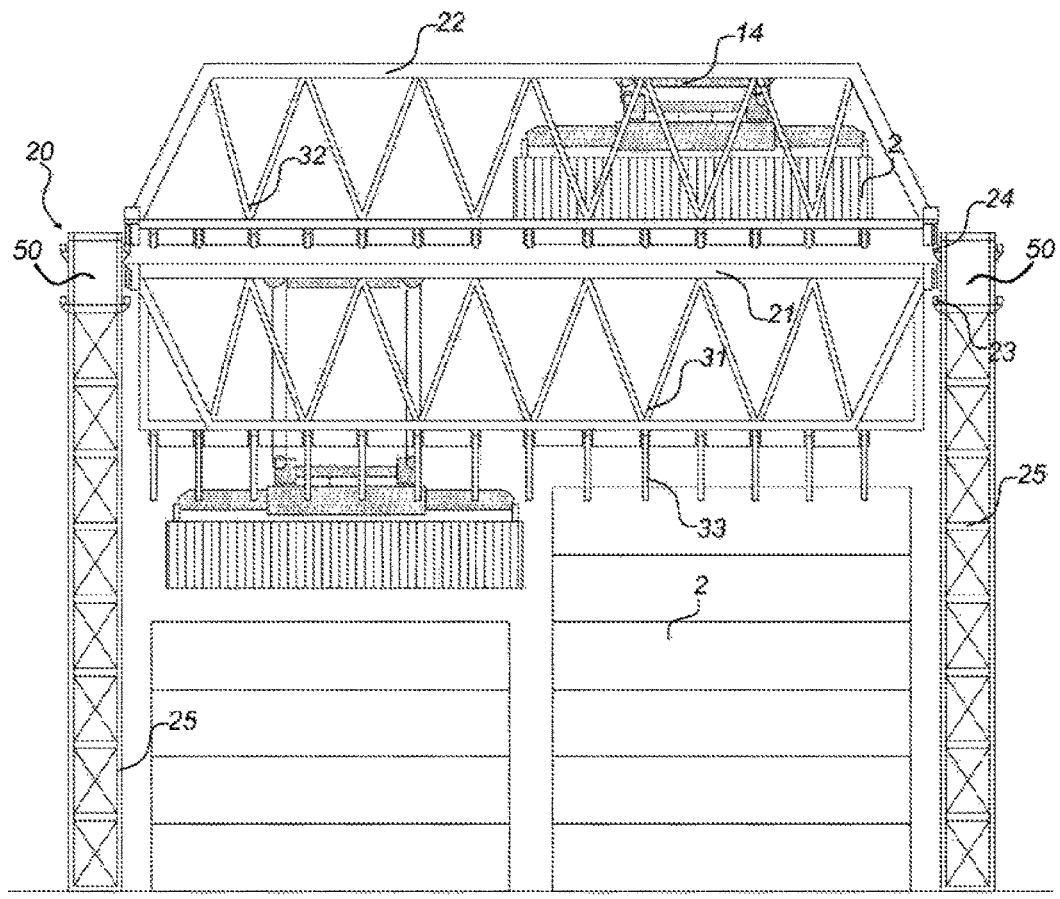
FIGS. 3 and 4 show an assembly of two overhead cranes according to an embodiment of the inventions.
Figure 4:
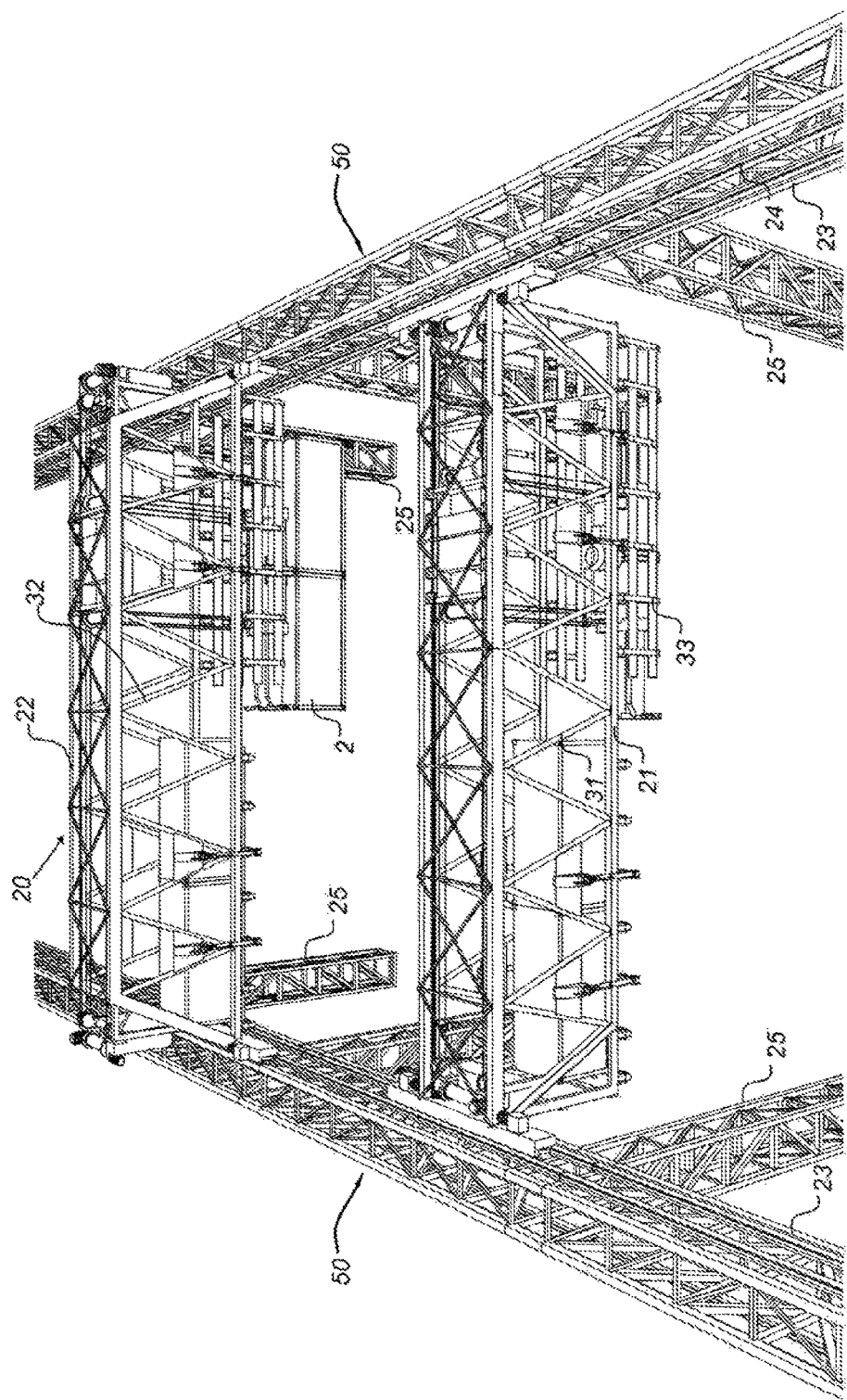

FIGS. 3 and 4 show an assembly 20 of two overhead cranes 21, 22 according to the invention, which run one above the other in different horizontal planes, at a relatively short distance from each other, on rail tracks 23, 24 which are situated above ground level and which are supported by common columns 25. The rail tracks 23, 24 are both attached to a common longitudinal support 50, which may be a girder or other type of support. The longitudinal support 50 is supported by the common columns. A lower overhead crane 21 comprises a truss frame 31 which is situated substantially below the level of the associated rail track 23, while an upper overhead crane 22 comprises a truss frame 32 which is situated substantially above the level of the associated rail track 24.

Figure 3A:
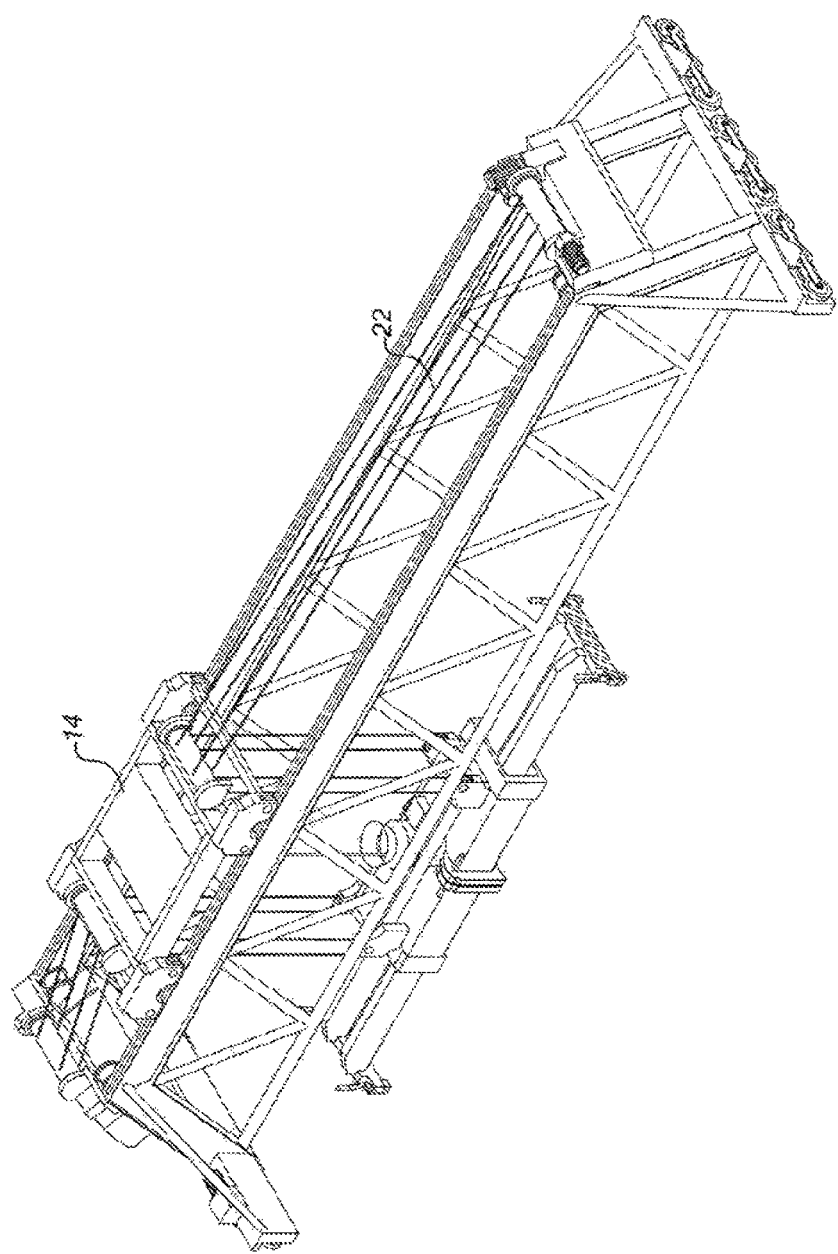

It will be clear to those skilled in the art that variants of the overhead cranes 21 and 22 are possible in which the carriage 14 and hoist are arranged on top of the truss frame, as is illustrated in FIG. 3a.

Figure 5:
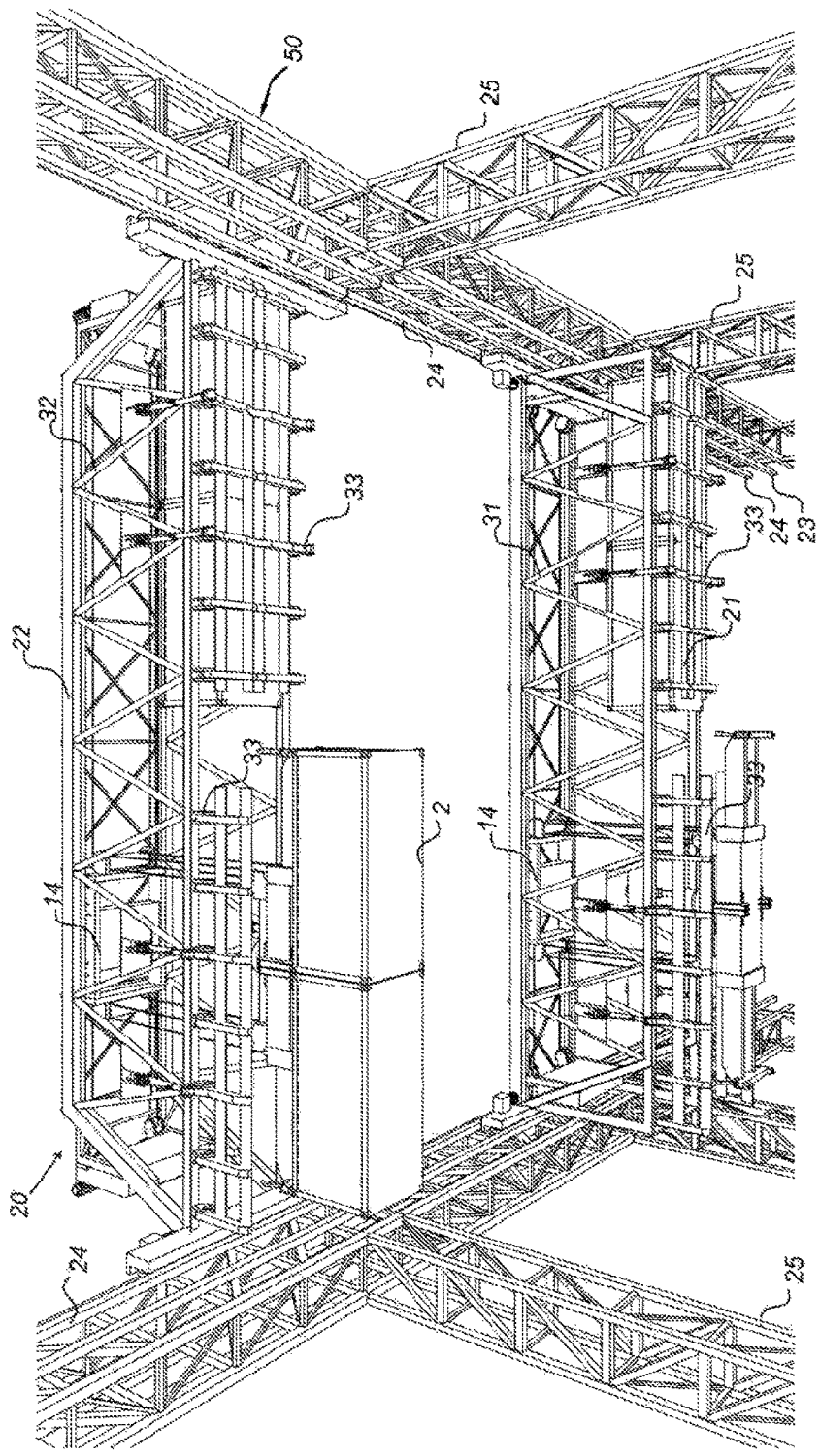
FIG. 5 shows an application of rotatable supports according to an embodiment of the invention.

FIG. 5 shows an application of rotatable supports 33 in the truss frame 32 of the upper overhead crane 22 which can be used to hold a container 2 inside the frame 32. The aspects which can be seen in FIG. 5 apply analogously to the lower overhead crane 21.

The supports 33 may be configured in several ways. In FIG. 3, they have been shown as individual tiltable transverse supports. In FIGS. 4 and 5, these are coupled to each other, so that the bottom of the container is also supported in the longitudinal direction. An equivalent support (not shown) is also, for example, a floor structure which is displaceable in the longitudinal direction between the lower edges and has a length which may correspond to the length of a container.

Figure 6:
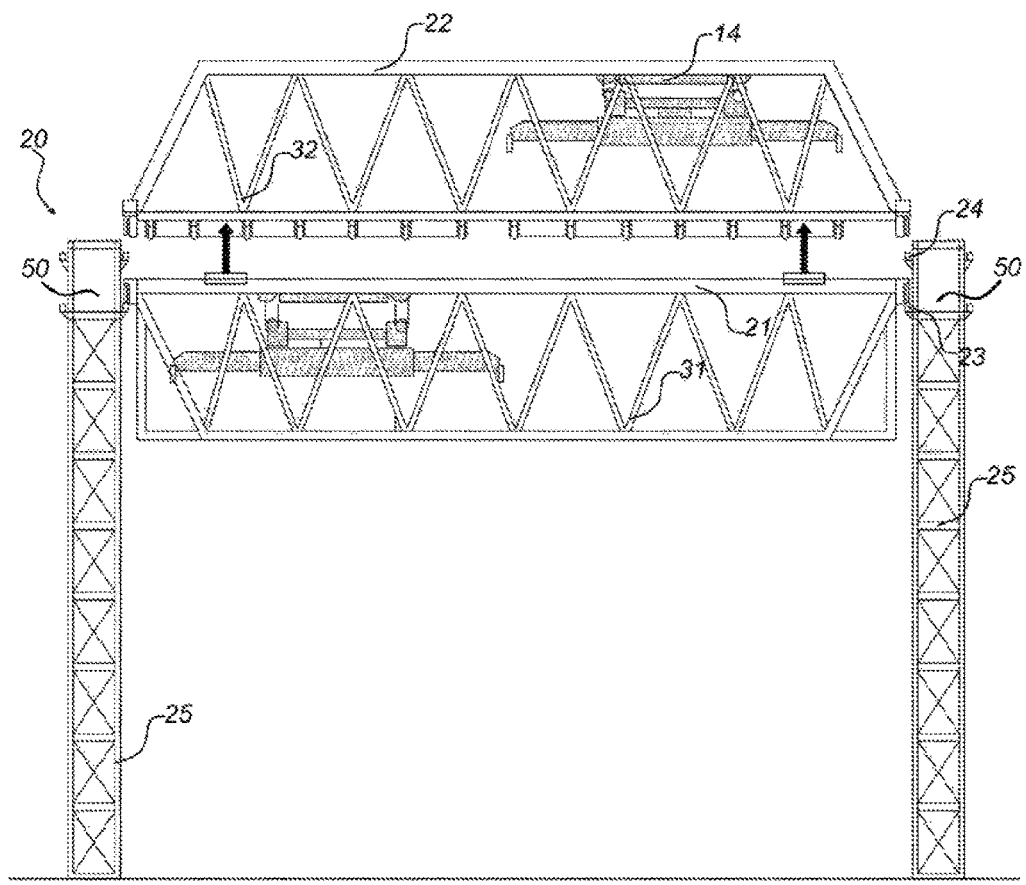
FIGS. 6, 7, 8, and 9 illustrate advantages of embodiments of the invention.

FIG. 6 shows the advantageous fact that, with the assembly 20 according to the invention, it is possible for the frame 32 of the upper overhead crane 22 to be hoisted up by lower overhead crane 21, after which said frame 32 can be transported to a replacement location or a workshop or another desired location. To this end, the frame 31 of the lower overhead crane 21 may be provided with lifting means.

Figure 7:
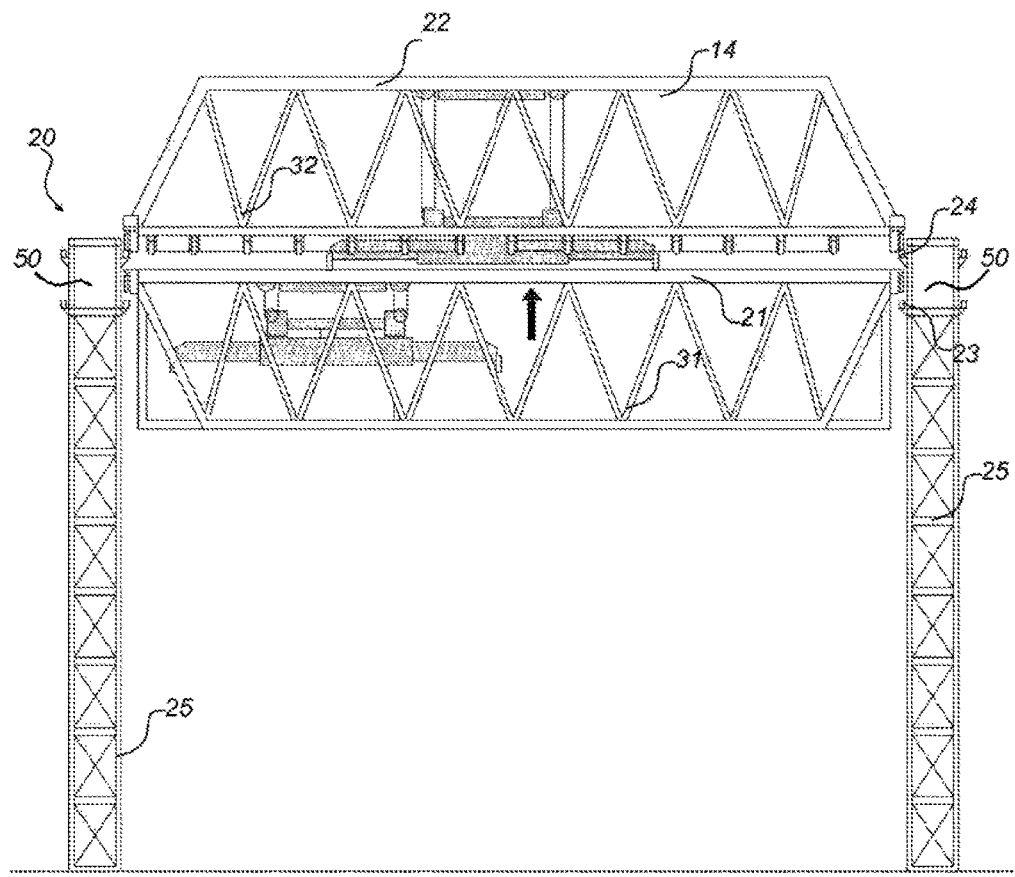

FIG. 7 shows the advantageous fact that, with the assembly 20 according to the invention, it is possible for the frame 31 of the lower overhead crane 21 to be hoisted up by the upper overhead crane 22, if desired by means of the spreader, after which said frame 31 can be transported to a replacement location or a workshop or another desired location.

Figure 8:
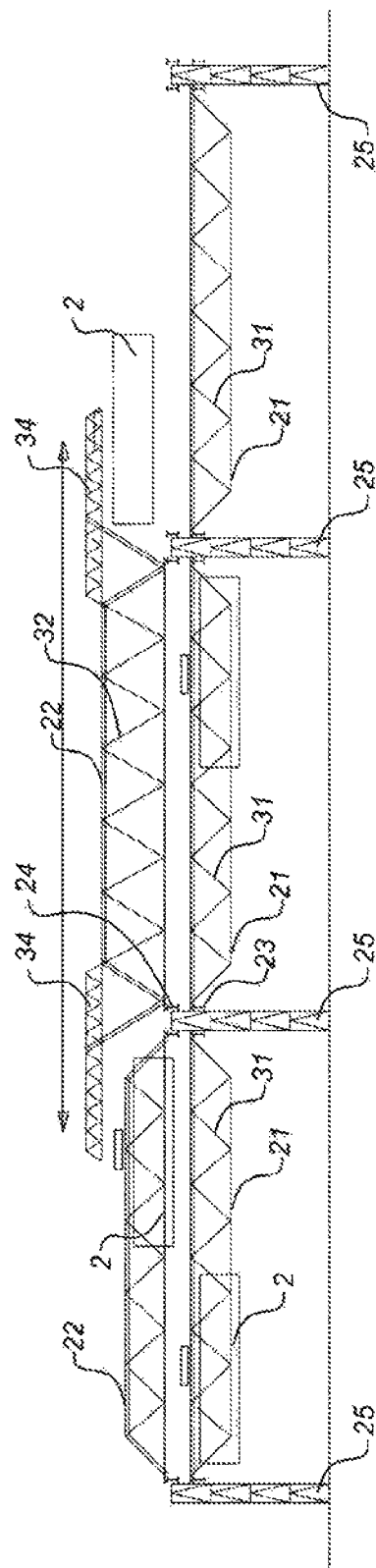

FIG. 8 shows the advantageous option where a truss frame 32 which is situated above the level of the associated rail track 24 is provided on one or two sides with an overhand 34 which extends beyond the rail track 24 and as a result of which it is also possible to set down or pick up a container in an adjacent stack lane.

Figure 9:
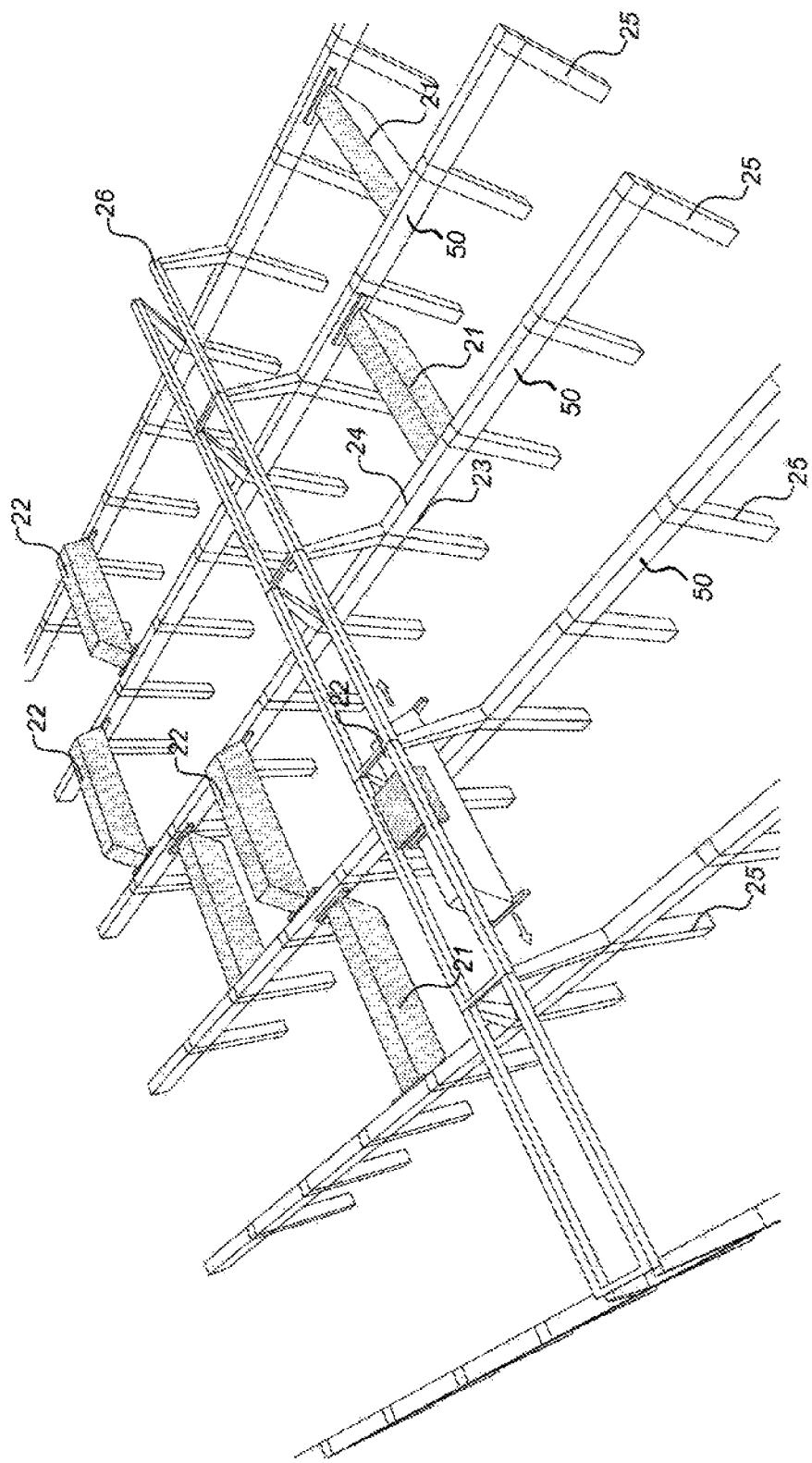

FIG. 9 shows the advantageous option where an elevated transverse crane track 26 is provided in order to be able to transfer overhead cranes 21, 22 from one lane to the other lane in the stack area. The transverse crane track 26 comprises supports which are placed on the horizontal carriers or crane track beams in which or on which the rails 23, 24 are arranged. The supports of the transverse crane track 26 are obviously placed on the horizontal carrier in such a manner that the overhead cranes 21, 22 are displaceable beyond the supports.

Figure 10:
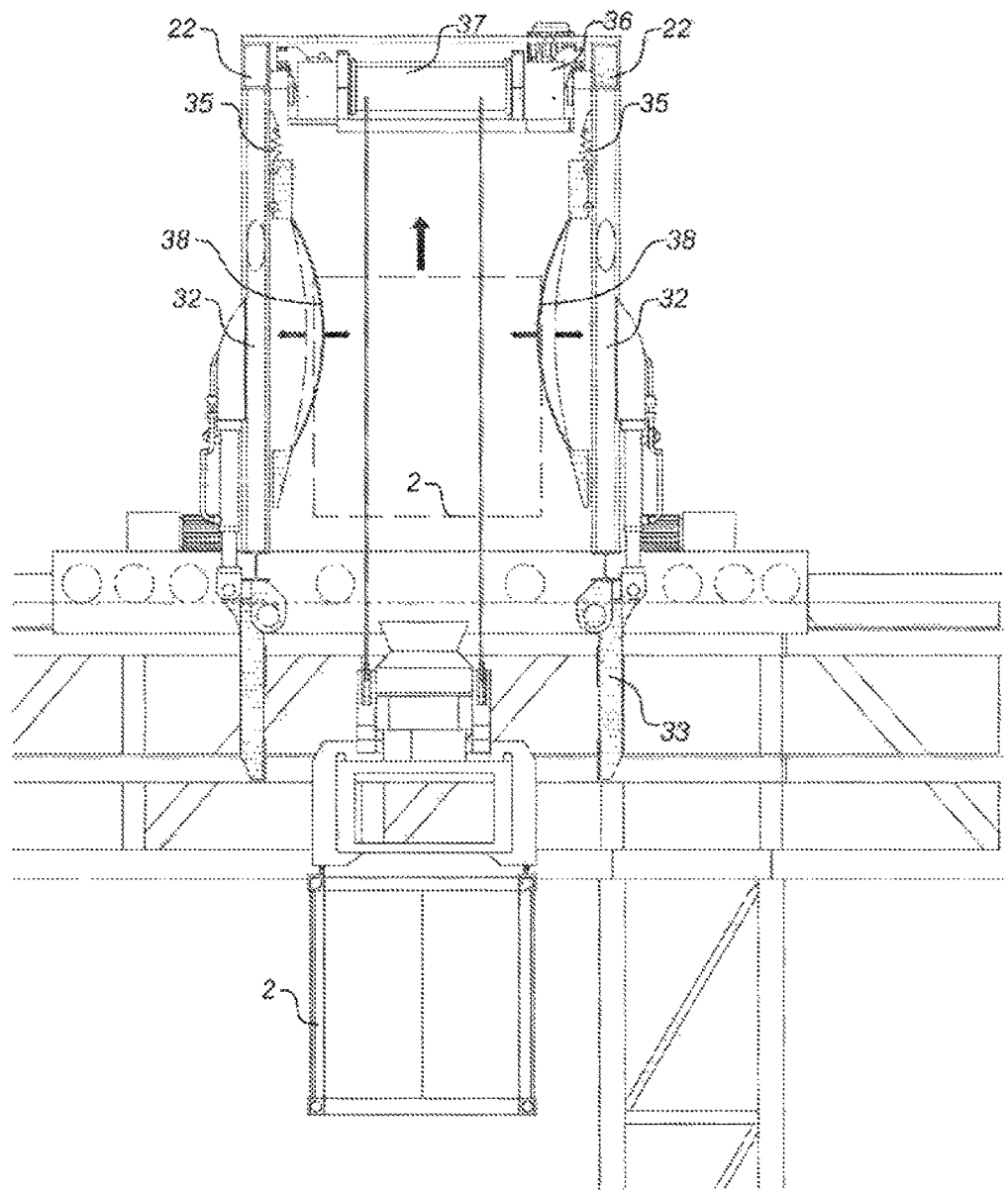
FIG. 10 shows a cross section of an upper overhead crane according to an embodiment of the invention.

FIG. 10 shows a cross section of the upper overhead crane 22 with a hoisted container 2. In order to prevent the container 2 from swinging sideways during transportation, horizontal supports 38 are actuated on both sides in at least two positions per container 2. In this example, the supports 38 comprise vertically oriented spring steel strips with a slight initial deflection which are pushed up to a side wall of the container 2 by a pressure mechanism 35. When the upper overhead crane 22 has reached its destination, the pressure mechanism 35 will then rise, if desired automatically, and the container 2 can be set down.

It is also clearly shown in FIG. 10 that, due to the relatively large width of the truss frame 32 of this new type of overhead container crane 22, it is possible to design the carriage 36 and the hoist 37 in such a manner that the construction height is minimal, thus saving space in the overall configuration of the assembly 20 of two overhead cranes 21, 22. The aspects which can be seen in FIG. 10 apply analogously to the lower overhead crane 21. It will be clear to those skilled in the art that variants of overhead cranes 21 and 22 are possible in which the carriage and the hoist are fitted on top of the truss frame.

Figure 12:
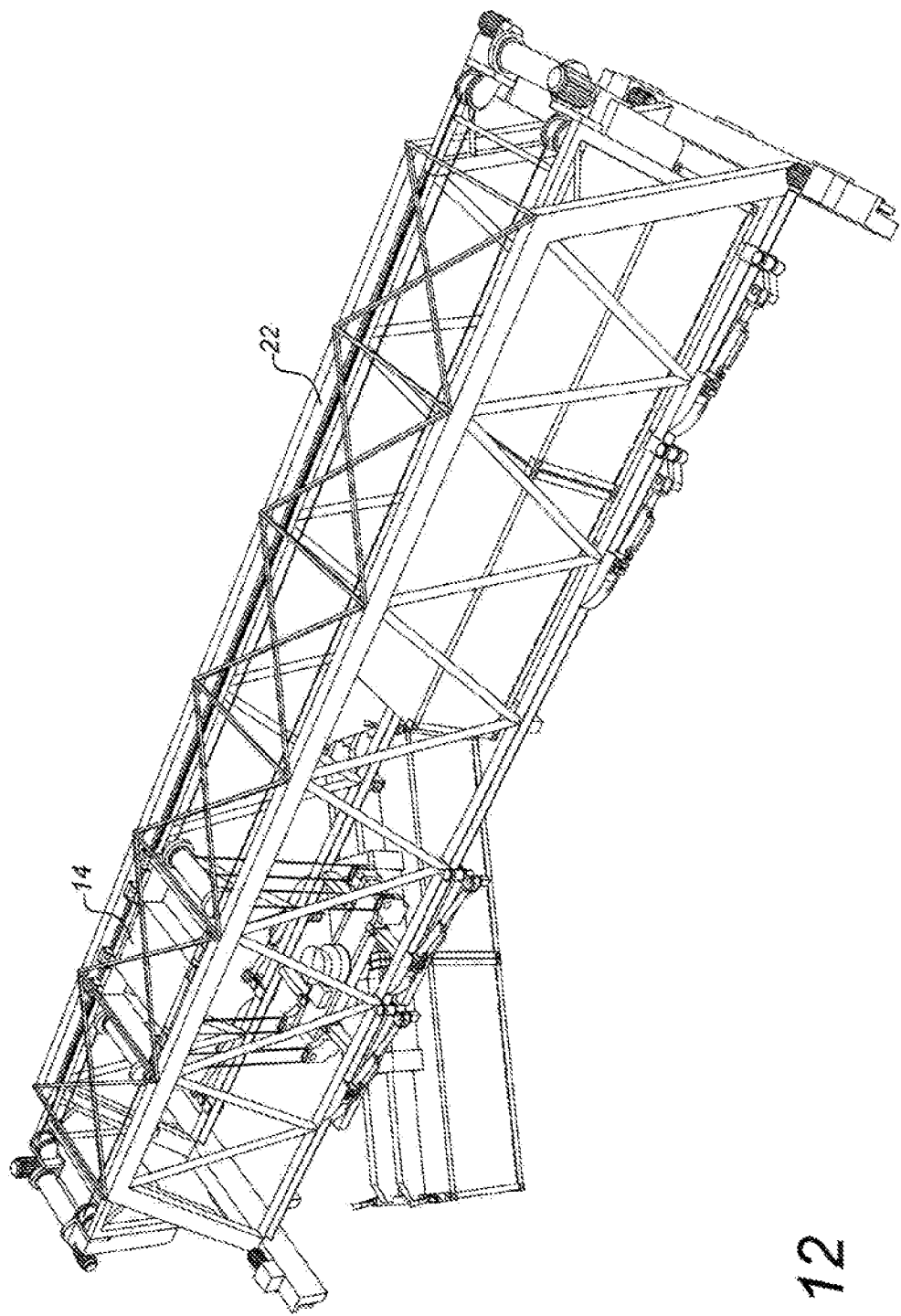
FIG. 12 shows a rotatable spreader according an embodiment of the invention.
Figure 13:
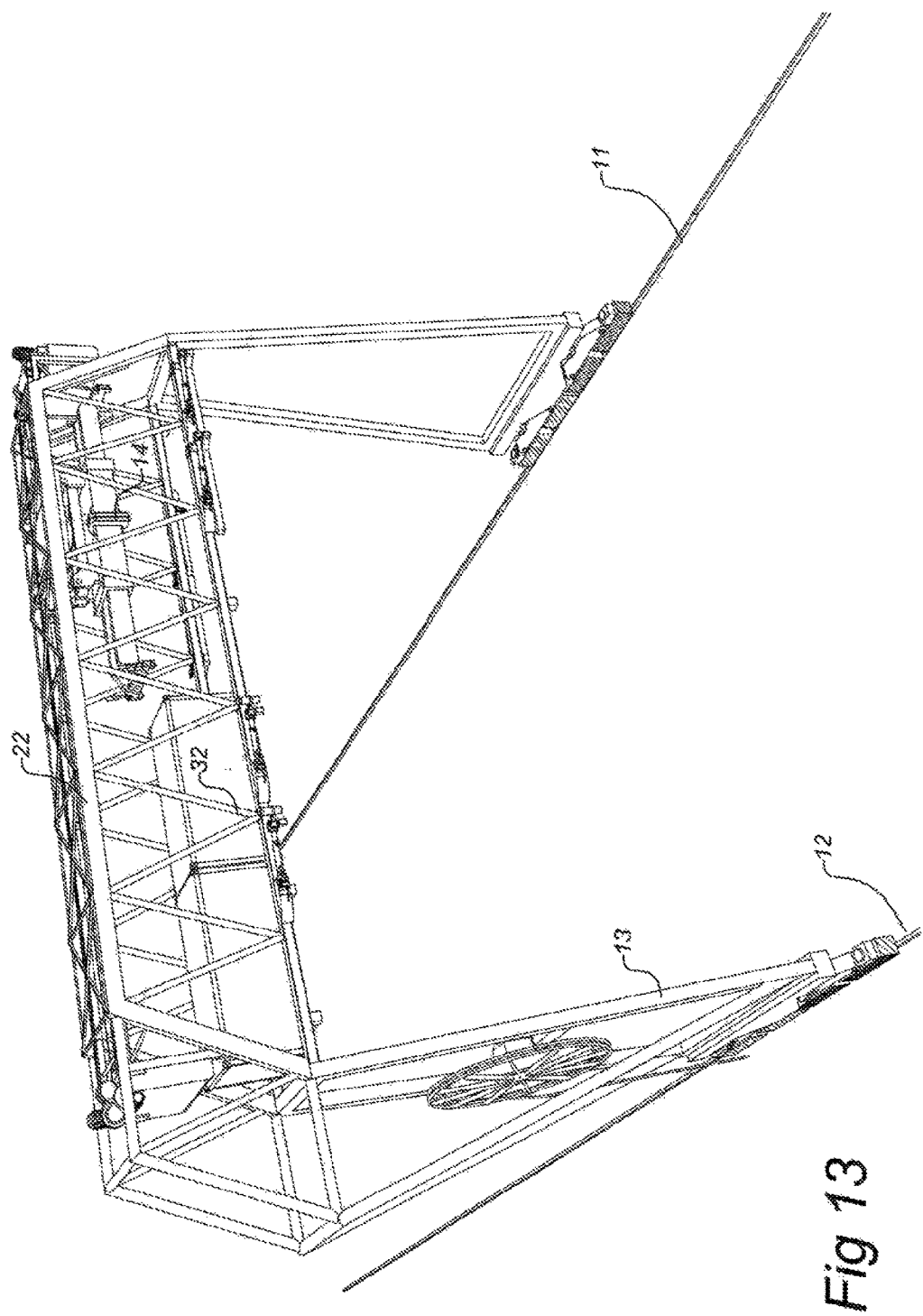
FIG. 13 illustrates an RMG fitted with a truss frame according to an embodiment of the invention.

As is the case for overhead carriage and the hoist, the shape of the truss frame also offers the possibility of using a rotatable spreader. FIGS. 12 and 13 show how a rotatable spreader 14 can position and fix itself between the bottom members of both truss girders. Although FIG. 13 relates to an RMG on a rail track 11, 12 at ground level, it will be clear to those skilled in the art that spreader 14 which is rotatable in the horizontal plane can be used in any (truss) frame according to the invention.

Above, an overhead crane 21, 22 for hoisting and moving containers 2 has been described which comprises a rail track 23, 24 which rests on the ground by means of columns 25, and a frame 31, 32 which is displaceable along the rail track 23, 24 and is provided with means for picking up and hoisting containers 2. The frame 31, 32 is provided, for example, on two sides with wheels which run on the rails of the rail track 23, 24. In particular, the frame 31, 32 is a truss frame which is suitable for accommodating at least one container 2 completely. In an assembly 20 of at least two overhead cranes 21, 22 as described, the rail tracks 23, 24 of the overhead cranes 21, 22 extend at different levels with respect to the ground, substantially parallel with respect to each other, and rest on the ground by means of common columns 25. This arrangement has the significant advantage that the overhead cranes 21, 22 can pass one another in the case of a failure and that each can pick the other up and transport it to a replacement location.

Figure 11:
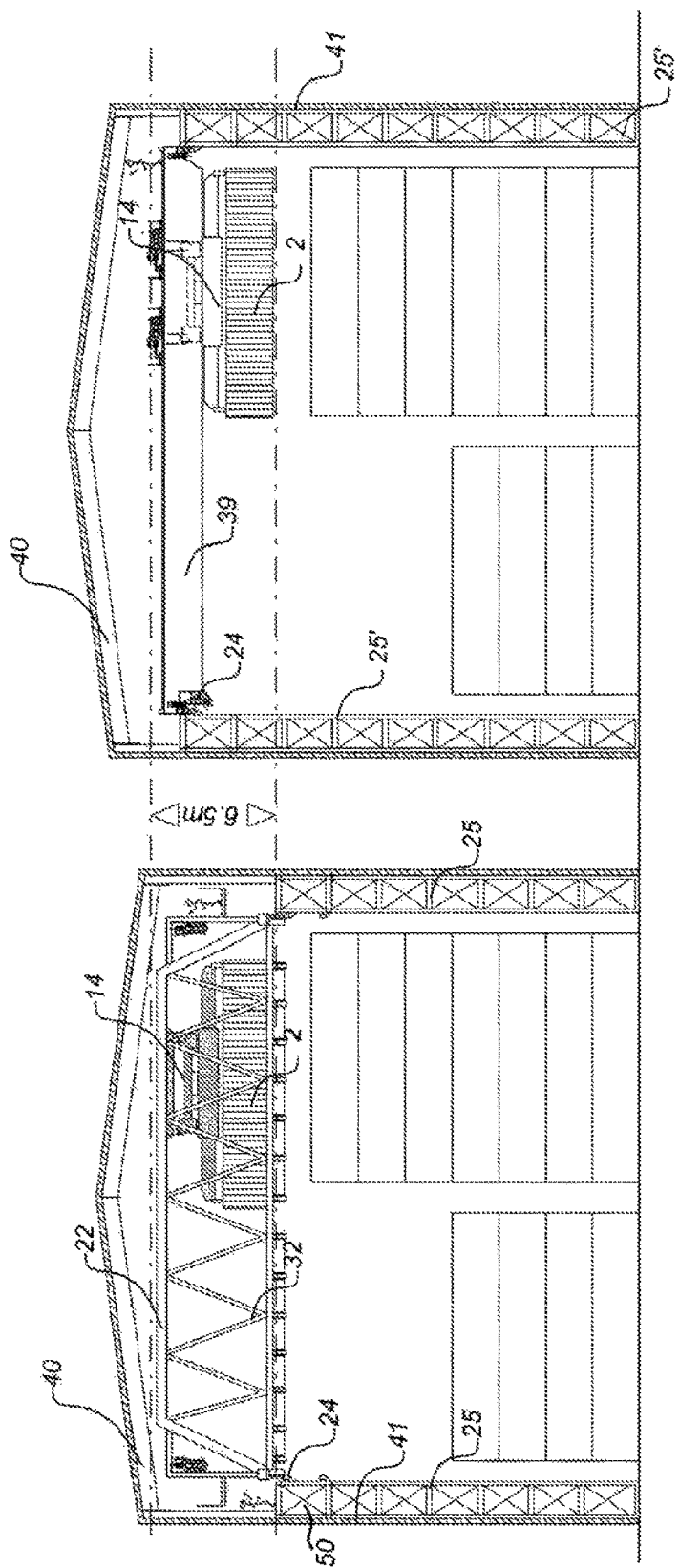
FIG. 11 shows a diagrammatic cross section of a container warehouse according to an embodiment of the invention.

Although the above description of the overhead cranes is mainly directed at their use in container terminals, a number of advantages also apply to their use in warehouses and distribution centres, as is illustrated in FIG. 11.

FIG. 11 is a diagrammatic cross section of a container warehouse 40. When using a conventional overhead crane 39, the crane track beam has to be fitted in a higher position than when an overhead crane according to the invention with an upper truss beam is used.

This means that the horizontal braking forces act at a higher point above ground level, which will require the building to be made stronger in order to achieve the same rigidity than is the case with a crane rail beam which is situated at a lower level.

Another drawback of the conventional overhead crane is the fact that, due to the safety requirements related to resolving failures and maintenance, a larger space has to be allowed between the crane 39 and the roof structure 40, which means a taller building than when an overhead crane according to the invention is used.

The advantage of a lower dead weight of crane 22 compared to crane 39 has already been described above.

Various aspects of the invention as described in this application have been tested through computer simulations.

Simulation results for the overhead cranes (2 cranes per lane) according the invention showed an increased stack density of about 1400 TEU/Ha, compared to 1100 TEU/Ha for conventional RMGs. According the simulations, the overhead cranes performed 60 moves/hour, compared to just 20 for the RMGs. The weight of the overhead cranes needs to be just 20 Tons, instead of 120 Tons for a conventional RMG system. The simulations show a reduction of travel distance per move, and a reduction of travel time per move. As a result, the terminal area can be decreased. A higher stack density results in a higher store capacity. Overall, flexibility is increased and operational and investment costs are reduced.

In the foregoing description of the figures, the invention has been described with reference to specific embodiments thereof. It will, however, be evident that various modifications and changes may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. An assembly, comprising:
a first overhead crane located below a second overhead crane;
a first longitudinal support spaced apart from a second longitudinal support;
a first set of rail tracks located below a second set of rail tracks, wherein respective rail tracks of the first set of rail tracks and the second set of rail tracks extend substantially parallel to each other at different levels with respect to ground,
wherein a first rail of the first set of rail tracks and a first rail of the second set of rail tracks are attached to the first longitudinal support, with the first rail of the second set of rail tracks being located above the first rail of the first set of rail track and a second rail of the first set of rail tracks and a second rail of the second set of rail tracks are attached to the second longitudinal support, with the second rail of the second set of rail tracks being located above the second rail of the first set of rail track;
columns that support the first longitudinal support and the second longitudinal support, and thereby support both the first set of rail tracks and the second set of rail tracks on the ground; and
a first frame displaceable along the first set of rail tracks and a second frame displaceable along the second set of rail tracks, each of the first frame and the second frame being provided with means for respectively picking up and hoisting first and second containers, with the first and second containers respectively being located completely within an interior of the first and second frames.

2. An assembly, comprising:
at least a first overhead crane and a second overhead crane;
a first longitudinal support;
a second longitudinal support;
a first set of rail tracks;
a second set of rail tracks, the second set of rail tracks being located above the first set of rail tracks,
wherein a first rail of the first set of rail tracks and a first rail of the second set of rail tracks are attached to the first longitudinal support, with the first rail of the second set of rail tracks being located above the first rail of the first set of rail track;
wherein a second rail of the first set of rail tracks and a second rail of the second set of rail tracks are attached to the second longitudinal support, with the second rail of the second set of rail tracks being located above the second rail of the first set of rail track;
a first set of columns that support the first longitudinal support and thereby support both the first rail of the first set of rail tracks and the first rail of the second set of rail tracks;
a second set of columns that support the second longitudinal support and thereby support both the second rail of the first set of rail tracks and the second rail of the second set of rail tracks;
a first frame displaceable along the first set of rail tracks and provided with first means for picking up and hoisting containers; and
a second frame displaceable along the second set of rail tracks and provided with second means for picking up and hoisting the containers,
wherein an interior of each of the first frame and the second frame is sized for accommodating at least one of the containers completely within said interior, and
wherein respective rail tracks of the first set of rail tracks and the second set of rail tracks extend substantially parallel to each other at different levels with respect to the ground, and rest on the ground via the first and second sets of columns.

3. The assembly according to claim 2, wherein at least one of the first frame and the second frame is provided, on two sides, with wheels which run on the first and second rails of a corresponding one of the first and second sets of rail tracks, along which the at least one of the first frame and the second frame is displaceable.

4. The assembly according to claim 2, wherein at least one of the first frame and the second frame is a truss frame.

5. The assembly according to claim 2, wherein the first frame of the first overhead crane is situated substantially below a level of the first set of rail tracks.

6. The assembly according to claim 2, wherein the second frame of the second overhead crane is situated substantially above a level of the second set of rail tracks.

7. The assembly according to claim 2, wherein, on at least one side of at least one of the first frame and the second frame, an overhang is provided which extends beyond a corresponding one of the first and second sets of rail tracks.

8. The assembly according to claim 2, comprising at least a rotatable or tiltable support or a floor part which is displaceable in a longitudinal direction which is arranged near an underside of at least one of the first frame and the second frame in order to support a first one of the containers after the first container has been hoisted and positioned inside at least one of the first frame and the second frame by a corresponding one of the first and second cranes.

9. The assembly according to claim 2, further comprising supports and a pressure mechanism comprising springs for pressing the supports against a side wall of a first one of the containers which has been hoisted and positioned inside one of the first frame and the second frame.

10. The assembly according to claim 2, wherein the at least one of the first means and the second means for picking up and hoisting containers comprise a spreader, which spreader is rotatable in a horizontal plane.

11. The assembly according to claim 2, wherein the second overhead crane is situated substantially below a level of the second set of rail tracks and the first overhead crane is situated substantially above a level of the first set of rail tracks.

12. The assembly according to claim 2, wherein the second overhead crane is situated at a higher level than the first overhead crane, and the second overhead crane is provided with a mechanism which is configured to hoist the first frame of the first overhead crane which is situated at a lower level than the second overhead crane.

13. The assembly according to claim 2, wherein the first overhead crane is situated at a lower level than the second overhead crane, and the first overhead crane is provided with a mechanism which is configured to hoist the second frame of the second overhead crane which is situated at a higher level than the first overhead crane.

14. The assembly according to claim 2, further comprising a third set of rail tracks situated at a higher level with respect to the ground than the first and second sets of rail tracks, the third set of rail tracks extending substantially at right angles to said first and second sets of rail tracks.

15. The assembly according to claim 2, wherein at least two parallel lanes are provided, wherein each lane is provided with at least one of the first and second overhead cranes and the first and second sets of rail tracks are configured to transport one of the first and second overhead cranes from one lane to the other lane.

16. The assembly according to claim 3, wherein at least one of the first frame and the second frame is a truss frame.

17. A container warehouse provided with the assembly according to claim 2.

* * * * *